US005416297A

United States Patent [19]

Luo et al.

[11] Patent Number: 5,416,297

[45] Date of Patent: May 16, 1995

[54] PLASMA ARC TORCH IGNITION CIRCUIT AND METHOD

[75] Inventors: Lifeng Luo; Jeffrey L. Peterson, both of Lebanon; David J. Rhodes, New London, all of N.H.

[73] Assignee: Hypertherm, Inc., Hanover, N.H.

[21] Appl. No.: 39,898

[22] Filed: Mar. 30, 1993

[51] Int. Cl.[6] .............................................. B23K 10/00

[52] U.S. Cl. .......................... 219/121.57; 219/121.54; 219/121.39; 219/121.52

[58] Field of Search ...................... 219/121.52, 121.54, 219/121.57, 121.48, 121.39, 121.44, 74

[56] References Cited

U.S. PATENT DOCUMENTS

| | | | |
|---|---|---|---|
| 3,558,973 | 1/1971 | Pochert et al. | 219/121.57 |
| 4,225,769 | 9/1980 | Wilkins | 219/130.4 |
| 4,280,042 | 7/1981 | Berger et al. | 219/121.54 |
| 4,814,577 | 3/1989 | Dallavalle et al. | 219/121.57 |
| 4,996,407 | 2/1991 | Traxler | 219/121.54 |
| 5,170,030 | 12/1992 | Solley et al. | 219/121.54 |
| 5,225,658 | 7/1993 | Yamaguchi et al. | 219/121.57 |

*Primary Examiner*—Mark H. Paschall
*Attorney, Agent, or Firm*—Testa, Hurwitz & Thibeault

[57] ABSTRACT

A high frequency, high voltage starting circuit for a plasma arc cutting torch is constructed and operated with isolation between a pilot arc circuit and a transfer arc circuit. The duration and value of the energy flow in the pilot arc after initiating the HFHV signal are controlled electronically. The maximum value is sufficient to initiate and support the pilot arc and its transfer. The duration is sufficiently long to allow the pilot arc to transfer, but sufficiently short that nozzle wear is reduced. In the preferred form both circuits have a common D.C. power supply and independent surge injector circuits each formed by a resistor and surge capacitor connected in parallel with the power supply. An L-C loop in the pilot arc circuit maintains a generally constant current output on discharge.

12 Claims, 3 Drawing Sheets

PLASMA ARC TORCH IGNITION CIRCUIT AND METHOD

BACKGROUND OF THE INVENTION

This invention relates in general to plasma arc cutting of metallic workpieces. More specifically it relates to a circuit and method for reducing nozzle wear while reliably starting a transferred plasma arc torch, even with a large standoff from a workpiece.

Reliable ignition and transfer of a plasma arc torch has been a significant problem throughout the development of plasma technology for cutting metallic workpieces. It is difficult to start a transferred arc between the electrode and the workpiece directly due to the relatively long distance separating them. Therefore, most plasma cutting systems start with a pilot arc between the electrode and the nozzle, a much shorter distance.

There are two ways to start the pilot arc. One solution has been contact starting, one form of which is described in U.S. Pat. No. 4,791,268. However, the principal starting technique in use today uses a high frequency, high voltage (HFHV) signal coupled to a power line from a D.C. power supply to the torch. The HFHV signal induces a spark discharge in a plasma gas flowing between the electrode and a nozzle, typically in a spiral path. A HFHV generator is usually incorporated in a power supply or in a "console" located remotely from the torch and connected to the torch by a lead set. This general arrangement is shown in a highly simplified schematic form in FIG. 1.

The arc between the electrode and nozzle is a pilot arc and the arc between the electrode and the workpiece is a transferred arc. The gas flow through the nozzle is ionized by the pilot arc so that the electrical resistance between the electrode and the workpiece becomes very small. Using a pilot resistor, a higher voltage is applied across the electrode and the workpiece to induce the arc to transfer to the workpiece after the gap is ionized. The time between starting the pilot arc and transferring to the work is a function of the distance of the torch above the work, the pilot arc current level, and the gas flow rate when the traditional start circuits are used. FIG. 2, described below in greater detail, shows a typical start circuit used in plasma cutting systems.

While this technique seems straightforward in practice, its analysis, execution and control present many difficult and complex problems. For example, at the time of arc ignition, the location of the arc on the electrodes, and its maintenance once it is initially struck depend on many factors that vary, and some of which may be interdependent. The result is that the voltage at which breakdown occurs, and the time at which it occurs, are random events. Some of the factors include the cathode and anode geometries and gap spacing, gas pressures, the type of gas, impurities in the gas, nature of local gas flow around the electrodes (laminar, turbulent, amount of swirl), the materials forming the anode and cathode and their surface condition, the place on the electrode where the arc initiates, the available voltage from the power supply, the transient response of the power supply, and electrode and nozzle wear. Interaction of these variables further complicates an analysis or control of ignition. A change in the arc current varies the gas pressure in the torch and the gas flow rate. Electrode and nozzle wear alter the physical location of the initial arc strike, the arc path over the electrode, and the time for the arc travel. Gas impurities deposit on the electrode and nozzle; these deposits change the physical location of the arc strike and the arc voltage. In turn, any increase in the arc voltage, regardless of its source, reduces the ability of the surge injection circuit to provide an initial arc current and, once the arc is struck, to act as a current source sufficient to build to and sustain a steady-state pilot arc.

The time that the pilot arc remains attached to the nozzle is a function of the standoff distance. The higher the standoff, the longer the time will be. The nozzle orifice can be damaged when the time exceeds a certain amount. However, a high standoff distance is necessary when piercing thick metal, e.g. ½ inch or more, in order to protect the nozzle front from the molten metal. The nozzle life is therefore short when thick plates are being cut.

A seemingly straightforward solution is to increase the level of the pilot current. The expectation is that this increase will in turn increase the level of ionized gas between the electrode and the workpiece causing the transfer time to decrease. However, in practice this solution does not work. When the standoff distance is high, the nozzle and the workpiece always share the pilot current for a while. This time of sharing leads to a pilot arc attachment time that results in damage to the nozzle.

Another seemingly straightforward solution is to increase the value of a pilot resistor in the pilot arc circuit so that the voltage between the nozzle and the workpiece become greater. This change does help to push the pilot arc to the workpiece, but there is a practical upper limit on the value of the resistor. For example, if the open circuit voltage of the D.C. power supply we used is about 275 volts, and since the arc between the electrode and the nozzle requires a certain amount of voltage, then the voltage drop available across the pilot resistor is limited. The higher the value of the resistor used, the lower the pilot current will be. For large resistors, given the limited potential, the resulting pilot arc current reaches a level that is insufficient to ionize the gap. As a result, transfer does not occur. With a standard 275 volt (open circuit voltage) D.C. power supply powering a Hypertherm model MAX®200 torch with conventional starting circuitry, as shown in FIG. 2, when a 6 ohm pilot resistor is used, the pilot arc current is only 20 amps. This current is not large enough to ionize the electrode-workpiece gap.

It is therefore a principal object of this invention to provide apparatus and a method of reliably starting and transferring the arc of a plasma arc cutting torch with a high frequency high voltage signal that reduces nozzle wear even where the torch to workpiece standoff is large.

Another object is to provide the foregoing advantage in a manner that is compatible with known starting circuits and requires no changes in the torch or the physics of the plasma.

Yet another object is to provide a system with the foregoing advantages which has a favorable cost of implementation.

SUMMARY OF THE INVENTION

A high frequency, high voltage (HFHV) pilot arc ignition and arc transfer method and apparatus for a plasma arc cutting torch has a pilot arc circuit and a transferred arc circuit. The pilot arc circuit applies the HFHV signal via lines of an electrical lead set to the electrode-nozzle gap in the torch. The transfer arc circuit provides current to ignite and sustain the transferred arc at a much greater current level than that of the pilot arc.

Both circuits have a D.C. power supply, which in the preferred embodiment is the same power supply. The main circuit includes a surge circuit formed by a surge capacitor to store charge and a resistor connected in series with the capacitor to limit the maximum flow on discharge when the arc transfers. The pilot arc circuits also includes a charge/discharge arrangement, preferably a capacitor-resistor surge circuit like that used in the main circuit.

The main and pilot circuits are isolated from one another after they are charged, but before the HFHV signal is applied. A standard pilot relay connected between the positive lead and the pilot surge circuit provides this isolation when it is open. The invention also includes circuitry to control the duration and value of the electrical energy provided to the pilot arc circuit by the charged pilot arc circuit. The duration and level are sufficient to initiate and maintain the pilot arc so that it ionizes the gap to the workpiece to produce the arc transfer. The pilot arc circuit terminates the pilot arc after a brief duration to avoid nozzle wear. For high current torches suitable for piercing and cutting thick plates, a preferred duration is 2 to 3 ms at standard pilot circuit currents and voltages.

Viewed as a method, the invention involves the steps of providing pilot arc and main circuits, isolating them before applying a HFHV signal to the pilot arc circuit to initiate a pilot arc, and controlling the pilot arc level and duration electronically to maintain a desired power level to the pilot arc and to terminate the arc after a brief interval sufficient to affect the transfer. In a preferred form, the method includes selectively connecting the circuits to charge them, prior to isolating them.

In the preferred form, using two RC surge circuits, the pilot arc control is provided by the RC combination and an inductor connected across the surge resistor that ramps the current rise during discharge to produce a generally constant energy output from the pilot circuit to the pilot arc. The pilot circuit has a diode network to block current reverses and to discharge the inductor. High value bleed resistors drain residual energy from the surge capacitors in the main and pilot circuits.

In an alternate form, the pilot circuit includes a second, separate D.C. power source instead of an RC surge circuit. Isolation occurs because the second power supply feeds only the pilot arc circuit and the main power supply feeds only the main circuit. A fast on-off switch or equivalent controller regulates the level and duration of the pilot arc current to meet the criteria noted above.

These and other features and objects of the invention will be more fully understood from the following detailed description which should be read in light of the accompanying drawings.

DETAILED DESCRIPTION OF THE PREFERRED EMBODIMENTS

Figure 1:
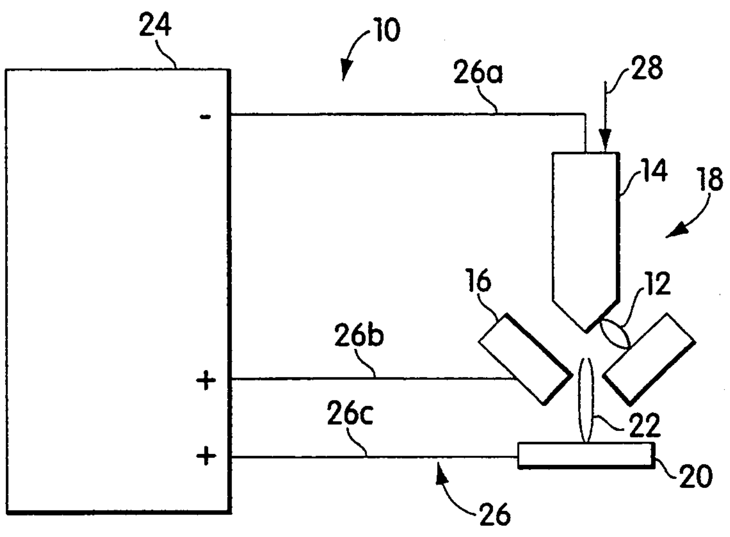
FIG. 1 is a highly simplified schematic diagram of a transferred arc plasma cutting system according to the present invention.

FIG. 1 shows a conventional plasma arc cutting system 10 using a high frequency, high voltage (HFHV) signal to initiate a pilot arc 12 between an electrode 14 and a nozzle 16 of a plasma arc torch 18. The arc then transfers to a workpiece 20 as a transferred arc 22. It has a much larger current level than the pilot arc and therefore can conduct significantly more energy to the metal workpiece 20 than the pilot arc. A D.C. power supply 24 provides the electrical power for the start up and steady state operation. A typical power supply produces a D.C. current of 100 to 400 amperes at 150 to 200 volts of cutting voltage. A conventional lead set 26 has a negative line 26*a* connected from the negative output terminal of the power supply to the electrode 14. Lines 26*b* and 26*c* connect from positive output terminals of the power supply to the nozzle 16 and workpiece 20, respectively. The torch 18 is of conventional design such as the products sold by Hypertherm, Inc. under its trade designations HT400, PAC500, and MAX®80/100/200.

A flow 28 of a plasma gas through the torch 18 is ionized by the pilot arc 12. A larger voltage drop is applied across the electrode and the workpiece (line 26*a* to line 26*c*) than across the electrode to nozzle in order to induce the arc to transfer to the workpiece once the gas in the electrode workpiece gap is ionized. With traditional starting circuits, such as shown in FIG. 2, the time interval that the pilot arc remains attached to the nozzle, from starting the pilot arc to arc transfer, is, in part, a function of the distance of the torch over the workpiece, its standoff.

As noted above, especially when the workpiece is a comparatively thick plate, e.g. ½ inch or more, it is advisable to use a fairly large standoff, e.g. ⅜ inch, to reduce the problem of molten metal splashed upwardly onto the torch from the workpiece during an initial piercing of the plate. During piercing molten metal cannot flow under the influence of gravity through a kerf to the bottom of the plate. The force of the plasma jet on a pool of molten metal then produces this splashing, which attacks the torch parts and can cause double arcing or gouging. As noted above, the increased standoffs associated with piercing and cutting thick plates increase the duration of the pilot arc attachment to the nozzle which reduces the life of the nozzle.

Figure 2:
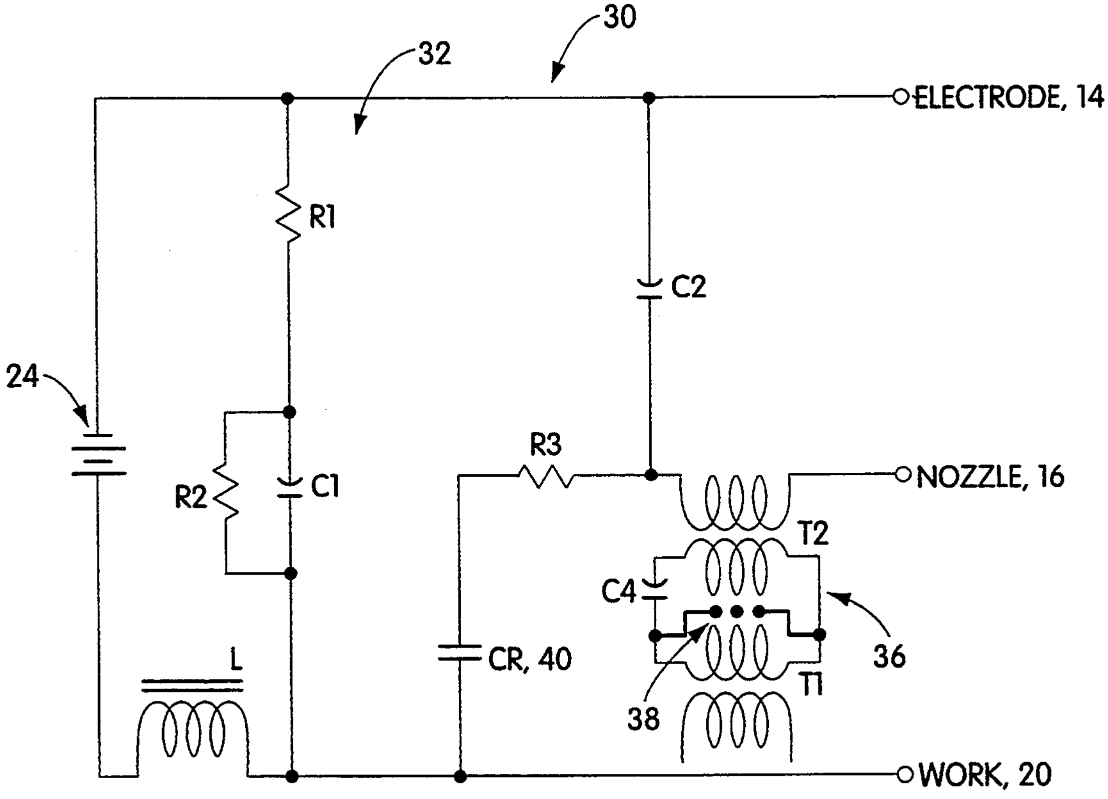
FIG. 2 is a circuit diagram of a prior art starting circuit for a plasma arc cutting system of the type shown in FIG. 1.

FIG. 2 shows a typical starting circuit 30 used in the system 10 to apply electrical power from the D.C. power supply 24 to the torch 18 and workpiece 20. On start up, the power supply 24 is at a zero current output and open circuit potential $V_{oc}$ until the pilot arc ignites. A main surge circuit 32 formed by surge resistor $R_1$ and surge capacitor $C_1$ provides an instantaneous current source to the electrode-nozzle gap as soon as it ionizes.

An iron core inductor 34 is connected in series with the power supply. It limits the ramp up speed of the current output of the power supply. Resistor $R_2$ is a bleed resistor of high value.

An HFHV generator 36 is of the Marconi type. A step up transformer $T_1$ powered by a standard 120V A.C. source supplies a high voltage output to a resonant circuit formed by a capacitor $C_4$ and an air core transformer $T_2$ having an inductance L. A spark gap 38 is connected in parallel with the resonant RL circuit. As is well known, this circuit produces a high voltage ringing electrical impulse. Typical values of this HFHV signal for plasma arc ignition are 5 to 10 kV at 1 to 3 mHz. The resonant circuit also serves as an insertion transformer for the HFHV signal to the lead set 26. This signal propogates through capacitor $C_2$ to the electrode 14 (cathode) and nozzle 16 (anode) where the high voltage generates charge carriers in the plasma gas between these elements. These charge carriers create an electrical current path necessary to start an arc in the plasma gas. The voltage and time at which breakdown occurs is random for a given set of operating conditions, if it will occur at all.

The surge injection circuit 32 is connected in parallel with the power supply 24. The power supply 24 charges the surge capacitor $C_1$ to its open circuit voltage, $V_{oc}$. To start the torch, the charged surge capacitor discharges to provide a current to the torch to initiate and sustain an arc. Ideally the arc strikes shortly after the application of the HFHV signal and the surge circuit acts as a current source while the power supply ramps up from a zero current output to a steady state current, first at a level to sustain the pilot arc 12, and then at a level to sustain the transferred arc 22. The total current to the pilot arc in this conventional arrangement is then the sum of the surge current from capacitor $C_1$ and the main current from the D.C power supply 24. The power supply ramps up to a steady state pilot arc current over a typical period of 10 msec.

A pilot relay 40 and pilot resistor $R_3$ are connected between the positive lead line **26*b* and the nozzle lead line 26*c*. After the pilot arc transfers the relay is open. The pilot resistor $R_3$ induces the arc transfer after the pilot arc is struck. With the relay 40** closed, the resistor is connected into the circuit. As a result, the total resistance between the electrode and workpiece along a path via the nozzle and resistor $R_3$ is greater than the resistance presented by the ionized gas path between the electrode and the workpiece directly.

Figure 3:
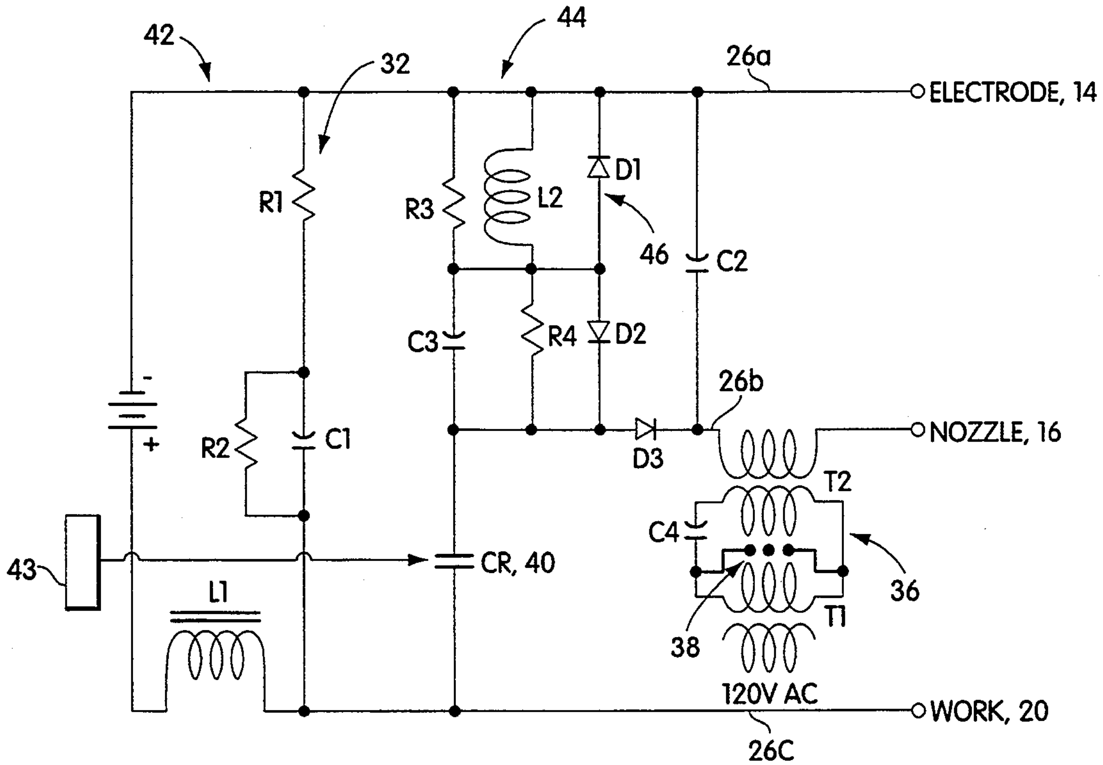
FIG. 3 is a circuit diagram of a starting circuit according to the present invention.
Figure 4:
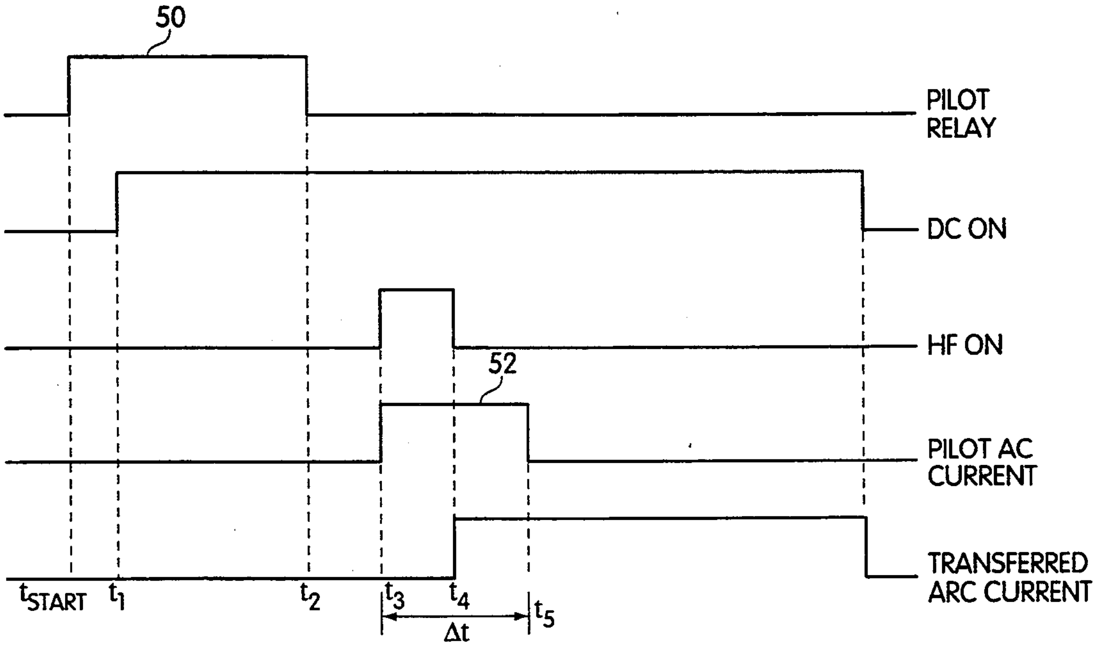
FIG. 4 is a timing diagram according to the present invention for the circuit shown in FIG. 3 showing the simultaneous state of five circuit parameters as a function of time.
Figure 5:
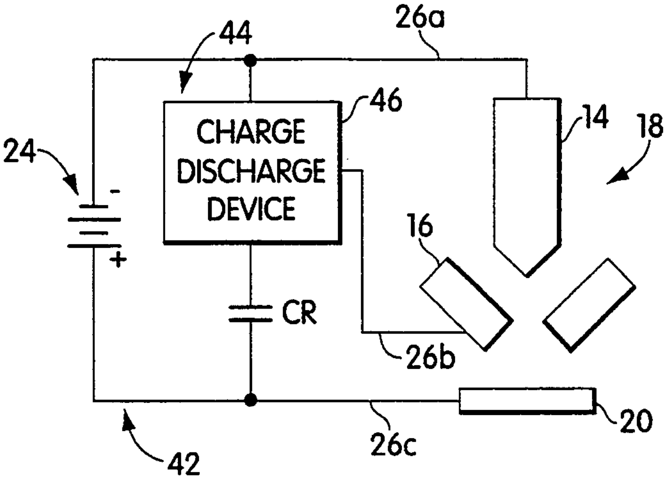
FIG. 5 is a generalized schematic diagram of a plasma arc cutting system according to the present invention in its preferred form.

FIGS. 3–5 illustrate a preferred starting circuit 41 and timing sequence according to the present invention. A principal feature of the present invention is that there is a main, or transferred arc, circuit 42 and a pilot arc circuit 44. The main circuit, as shown, includes principally the power supply 24, the inductor 34, the surge circuit 32, and associated leads to the electrode and workpiece (like parts in FIGS. 2 and FIGS. 3 and 5 having the same reference numerals). This circuit provide electrical power to the electrode-workpiece gap independently of the pilot arc circuit.

The pilot arc circuit 44 includes the power supply 24, a pilot charge/discharge network 46, capacitor $C_2$, the HFHV generator 36, and associated leads to the electrode and nozzle. A principal feature of the present invention is that the pilot relay CR is connected between the circuits 42 and 44 as shown so that when it is open the circuits are isolated from one another. When the relay CR is closed, the power supply can recharge both circuits. The relay can be a relay in the conventional sense or an electronic switch. "Relay" should be understood to include both, and any other device that can function in the manner described.

In the preferred form illustrated, the pilot arc circuit charge/discharge network 46 includes a surge circuit formed by a surge capacitor $C_3$ connected in series between leads **26*a* and 26*b* with a resistor $R_3$ that limits the initial current peak on pilot arc ignition when the surge capacitor $C_3$ begins to discharge. The capacitor $C_3$ is initially charged by the power supply 24 to its open circuit voltage $V_{oc}$. The value of the capacitor $C_3$ then determines the total energy available to the pilot arc after it ignites. This is in sharp contrast to the conventional circuit in FIG. 2 where the total current to the pilot arc is the sum of the current supplied by the surge capacitor $C_1$ and the current output of the power supply 24**.

Because the only energy source in the isolated pilot arc circuit is the charged capacitor $C_3$, as the voltage across the capacitor $C_3$ decreases during discharge, the pilot arc current will also decrease. To counteract this effect, an inductor $L_2$ is connected in series with the capacitor $C_3$. The inductor $L_2$ allows the pilot current to ramp up when the circuit closes (the pilot arc ignites) and a potential difference appears across it. The values for $C_3$ and $L_2$ are selected so that they together, and in cooperation with the current peak limiting function of $R_3$, produce a generally constant pilot current level over a brief interval $\Delta t = t_5 - t_3$ (FIG. 4).

The charge/discharge network 46 also includes a set of diodes $D_1$–$D_3$ that discharge and protect the circuit components during a voltage reversal. Diode $D_1$ discharges the inductor $L_2$ rapidly when the voltage inverses. $D_2$ protects capacitor $C_3$ against the voltage reversal. $D_3$ prevents a reversal of the pilot current. Resistor $R_4$ is a high value bleed resistor comparable to resistor $R_2$.

FIG. 4 illustrates the operation of the starting circuit of FIG. 3 as a function of time. To start the torch, the pilot relay 40 is closed at $t_{start}$, as indicated at 50 in the top graph. This allows the power supply to charge both circuits 42 and 44, or more specifically, the capacitors $C_1$ and $C_3$ in the surge circuits. The power supply is turned on at $t_1$, after $t_{start}$, but before the HFHV signal is started at $t_3$. The pilot relay is then opened at $t_2$. This isolates the pilot arc circuit 42 from the transferred arc circuit 44. Any energy to the nozzle then originates exclusively in the pilot arc circuit. Next the HFHV generator 36 is turned on at $t_3$. Following shortly thereafter (substantially simultaneously as shown), the HFHV signal ionizes the plasma gas flow between the electrode and the nozzle and initiates the pilot arc 12, as indicated by the step function increase at $t_3$ in the "Pilot Arc Current" graph in FIG. 4. The HFHV signal is terminated at $t_4$. A typical value for the HFHV signal duration is about 1 msec. For another power supply, torch, starting circuit, and other operating conditions such as gas flow rate and standoff this interval will vary. The arc transfers at $t_4$ to the workpiece.

The pilot arc duration and power level, illustrated as a generally square pulse 52 in FIG. 4, are controlled by the pilot surge circuit, $C_3$ and $R_3$, inductor $L_2$ and the three diodes $D_1$–$D_3$. The pulse magnitude is sufficient to ignite and maintain the pilot arc 12. The value of the maximum current $I_p$ in this pulse varies from application to application, but 80 amperes is a typical value for high current systems. The duration of pulse 52, $\Delta t = t_5 - t_3$, is selected to be comparatively brief, e.g. 2 to 3 msec, as compared to comparable prior art starting circuits used to start torches with a large standoff. The duration Δt, however, should be sufficiently long that transfer occurs reliably before the energy in the pilot arc circuit dissipates. The duration At is sufficiently short, and the maximum energy in the pilot arc circuit during Δt is sufficiently low, that there is a significant reduction in nozzle wear as compared to conventional circuits, e.g. FIG. 2. This invention uses circuitry, not plasma physics and/or a redesign of the torch itself, to control the pilot arc energy and duration. This invention dramatically reduces the pilot arc duration regardless of the standoff used. The pilot arc duration of conventional circuits is about 100 msec when a standoff distance of ⅜ inch is used. Maximum reductions are in the order of 98%. These reductions increase nozzle life by approximately 3 to 5 times conventional nozzle life under the same operating conditions.

FIG. 5 illustrates one broad approach of the present invention—charging a passive pilot arc circuit, isolating it before pilot arc ignition, and then controlling the discharge through the design of the pilot arc circuit. While FIGS. 3 and 4 illustrate a preferred arrangement for implementing this approach, it is not the only Way to produce the desired operational characteristics. Any suitable charge/discharge arrangement can be used.

Figure 6:
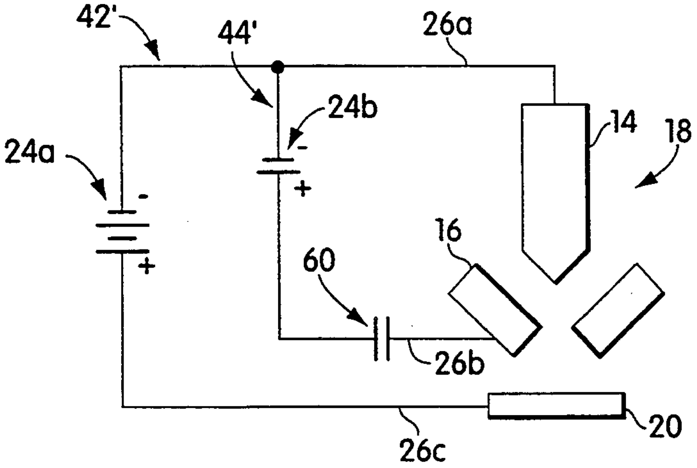
FIG. 6 is a generalized schematic diagram of corresponding to FIG. 5 showing an alternate form of the present invention using two power supplies.

FIG. 6 illustrates an alternative embodiment with two independent power supplies, 24*a* and 24*b*, that act as current sources. The negative leads of both power supplies are connected to the electrode 14 via the negative lead 26*a*. However, the positive lead 26*b* is connected between the positive terminal of supply 24*b* and the nozzle to form a pilot arc circuit 42′ and the positive terminal of supply 24*a* and the workpiece to form the main circuit 44′ (like parts in FIG. 6 having the same reference numbers as FIGS. 3–5, but primed). To control the total energy flowing through the pilot arc circuit, a fast on-off switch 60 is connected in the pilot arc circuit between the power supply 24*b* and the nozzle. The switch can be any of a wide variety of conventional type devices such as a solid state relay. The switch operates in response to a controller 43 in a central console (which can be housed with the power supply), or preprogrammed to operate in a set manner according to the present invention (pursuant to the timing diagram of FIG. 4).

By way of illustration, but not of limitation, the open circuit voltage of the power supply ($V_{oc}$) 24 is 275 volts D.C., the pilot arc 12 has a generally steady maximum current $I_p$ of about 40 to 100 amperes, and the pilot arc duration is about 1 to 5 msec. The values for $R_1$ and $C_1$ are 2Ω and 250 μF and the values for $R_3$ and $C_3$ are 3Ω and 800 μF. The inductor $L_2$ has a value of 2.8 mH, the inductor L, has a value of 4 mH and the resistors $R_2$ and $R_4$ have values of 100 kΩ and 10 kΩ, respectively. The capacitor $C_2$ has a value of 0.5 μF and the relay 40 is a model PRD 3AJO 120 v manufactured by Potter & Bromfield.

There has been described a plasma arc torch HFHV starting circuit and method that reliably ignites a pilot arc and transfers it regardless of the standoff from the workpiece. The invention controls the duration and level of the pilot arc to reduce greatly the wear on the nozzle during this start up and thereby increase nozzle life. The invention provides these advantages while also providing a reliable start and with no changes in the torch, or the plasma physics. Moreover, these advantages are produced exclusively electronically, and using conventional electronic components to modify the standard starting circuitry.

While the invention has been described with respect to its preferred embodiments it will be understood that various modifications and alterations will occur to those skilled in the art from the foregoing detailed description and the accompanying drawings. For example, while the discharge pattern of pilot arc circuit energy has been described as generally square, variations in the energy level are possible, whether varying periodically through the pulse interval, generally increasing or decreasing through the interval, or following some more complex waveform such as a bell curve. If the arc fails to transfer, it is also contemplated to restart the ignition cycle, whether manually or automatically. These and other variations and modifications are intended to fall within the scope of the appended claims.

What is claimed is:

1. A method of starting a plasma arc torch for cutting a workpiece using a high frequency high voltage (HFHV) signal to ionize a plasma gas to initiate a pilot arc between an electrode and a nozzle, comprising
   providing at least one D.C. power source,
   connecting said source to the electrode and nozzle by a pilot arc circuit,
   connecting said source to the electrode and the workpiece by a transferred arc circuit,
   electrically isolating the pilot arc circuit from the transferred arc circuit before the application of the HFHV signal, and
   controlling the duration and value of the total energy flowing in the pilot arc circuit to the pilot arc, said controlling limiting the duration to a period sufficient only to transfer the arc to the workpiece, and said controlling limiting the total energy in pilot arc circuit to a value sufficient only to initiate, sustain and transfer the pilot arc.

2. The method of claim 1 wherein said isolating comprises providing separate power supplies for the pilot arc and transferred arc circuits and said controlling comprises fast on-off switching of the pilot arc circuit.

3. The method of claim 1 further including charging said pilot arc and transferred arc circuits prior to said HFHV signal, and wherein said isolating comprises electrically disconnecting said circuits after said charging, but before said HFHV signal.

4. The method of claim 1 wherein said value of said total energy flowing is generally constant.

5. A method for HFHV starting a pilot arc discharge between an electrode and nozzle of a plasma arc torch spaced apart by a first gap and transferring the arc to a workpiece spaced from the torch and from the electrode by a second gap, where there is at least one source of D.C. power, comprising
   providing a pilot arc circuit between said power source and said first gap,
   providing a transferred arc circuit between said power source and said second gap,
   isolating the pilot arc circuit electrically from the transferred arc circuit before applying the HFHV signal, and
   controlling the duration and value total energy flowing in said pilot arc circuit to reduce wear of said nozzle.

6. The method of claim 5 wherein there is one power source and further comprising charging said pilot arc and transferred arc circuits from said power source before said isolating.

7. A starting circuit for a plasma arc torch having an electrode and nozzle spaced by a first gap, where the torch is spaced over a workpiece, where the electrode and workpiece are spaced by a second gap, and where the starting circuit includes a source of a HFHV signal to ionize a plasma gas in the first gap to initiate a pilot arc and at least one D.C power source, comprising, a pilot arc circuit electrically connecting said at least one power source to the first gap, a transferred arc circuit electrically connecting said at least one power source to said second gap, means for electrically isolating said pilot arc and transferred arc circuits from one another before said HFHV signal, and means for controlling the duration and value of the total energy flowing from said pilot arc circuit to the pilot arc after said isolating and during the period beginning with the initiation of said HFHV signal and ending with a transfer of the arc to the workpiece, said controlling limiting the value and duration to reduce nozzle wear.

8. The starting circuit of claim 7 wherein said means for isolating comprises a relay connected between said pilot arc and transferred arc circuits such that said circuits are electrically independent of one another when said relay is open.

9. The starting circuit of claim 8 wherein said pilot arc and transferred arc circuits each include surge circuits adapted to be charged by said at least one D.C. power supply when said relay is closed.

10. The starting circuit of claim 9 wherein said pilot arc surge circuit includes a surge capacitor, a surge resistor in series with the capacitor, and an inductor connected in series with a surge capacitor and in parallel with a surge resistor.

11. The starting circuit of claim 10 wherein said pilot arc circuit further includes diode means connected to protect said pilot arc circuit against current and voltage reversals and to discharge said inductor.

12. The starting circuit of claim 7 said isolating means comprises two of said power supplies, one connected in each of said pilot arc and transferred arc circuits, and wherein said means for controlling comprises a fast on-off switch in said pilot arc circuit.

* * * * *